Figure 1:
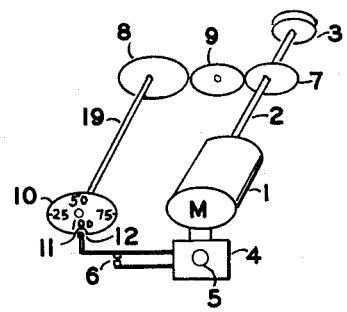

Aug. 28, 1962   H. A. GEORGE   3,051,885
COMPENSATING COIL WINDING MEANS
Filed Jan. 4, 1960

INVENTOR.
HOWARD A. GEORGE
BY James P. Malone

United States Patent Office 3,051,885
Patented Aug. 28, 1962

3,051,885
COMPENSATING COIL WINDING MEANS
Howard A. George, Connecticut View Drive,
Mill Neck, N.Y.
Filed Jan. 4, 1960, Ser. No. 403
1 Claim. (Cl. 318—467)

This invention relates to coil winding means and more particularly to such means having means for turning a shaft a predetermined number of turns with automatic compensation for variable overrun of the motor drive.

The present application is directed to the problem of turning a shaft a predetermined number of times by means of a motor where the operation is repeated continuously. The difficulty with this type of operation is that after the motor is turned off there is a certain amount of overrun which is not a constant but which varies with temperature, motor speed, condition of the motor bearings, and varying frictional loads in the driving system.

This problem is particularly important in connection with the winding of electrical coils as these coils are designed to have certain electrical properties which are a function of the number of turns. Therefore if the number of turns is not closely controlled the electrical coils will be inoperative for their intended use. Various systems of brakes have been evolved but since they necessarily employ another frictional force they only add another variable factor to the problem. It is impossible to stop a motor instantaneously as that would cause structural damage to the apparatus, and anything approaching instantaneous stopping creates special difficulties in wire tension control.

The present invention solves this problem by means of a rotatable wheel or disc which is adapted to de-energize the motor, said disc being directly geared to the driven shaft so that it makes exactly one revolution when the driven shaft has made the required number of turns as determined by the coil specifications. The control disc has a notch in its periphery which permits an electrical contact to open which operates to de-energize the motor. This will not prevent overrunning of the motor. However, on the next cycle the control disc will operate the shut-off prior to the actual number of turns desired by the amount of the overrun. For example, assume it is desirable to place 100 turns on a coil form. The shaft carrying the notched plate is driven by gears which cause it to rotate once in every 100 turns of the driven shaft on which the coil is mounted. Therefore, when 100 turns are placed on the coil form the motor will be de-energized. Now assume that the motor overruns 8 turns. On the next operation the control disc will shut off the motor at 92 turns and the motor will overrun the same 8 turns so that approximately 100 turns will be placed on the coil. The control disc operated contact only de-energizes the motor. The notch is made wider than any expected movement of the disc due to overrun of the motor so that the control disc cannot start the motor again. The start relay may be operated only by a manual push button or foot switch. After the motor warms up and other conditions change the overrun may gradually increase to 9, 10, 11, etc., turns. However, as this change occurs it will be automatically compensated as previously explained.

Conventional counting means generally involves a counter using drums or other devices which must be reset to zero for each winding cycle. This often requires at least three operator motions after such a counter has de-energized the motor. This includes shutting off a power switch (otherwise the motor would restart when the counter was reset), resetting the counter, and thirdly closing the switch which was opened in the first place. The present invention reduces all of these operations to a single motion, i.e., the pressing of a foot switch or manual button as a signal that the operator is ready for the winding operation to start. Such prior arrangements are not only complicated but require additional time lost from the production cycle so that the counter can be completely reset before the shaft begins to turn. In the present invention, if resetting can be said to exist, it is instantaneous.

With conventional counters it is customary to preset the wheels to shut off the motor several turns before the desired count is reached; the amount being that judged to permit normal overrun so as to arrive at the desired count. In practice the operator generally will make final corrections for each coil by manually turning the machine shaft. When the overrun deviates considerably from the selected value, the preset wheels are changed by the operator to reduce the manual correction. Since there is a constant change in conditions affecting overrun, conventional counting means require constant attention and frequent adjustment to compensate for these variables.

Another advantage of this invention is that since the notched plate rotates continuously and always in the same direction, there is no error due to lost motion in the gears or associated mechanical parts. With a conventional counter which is reset before starting each coil, there is always some fraction of a turn, and under certain circumstances several turns, of the winding spindle before the counter is turning with the coil.

Another advantage of this design is that all parts are moving at relatively low speeds. Conventional counters of the predetermining drum-type must have at least one wheel rotating at winding speed or 1/10 of winding speed. Since winding speeds of 10,000 r.p.m. to 20,000 r.p.m. are now being required, such devices are subject to excessive wear. In most designs there is also an excessive shock load since at every 10 turns an additional wheel must be momentarily accelerated to the speed of the units wheel, and after turning 1/10 of a revolution it must be instantaneously returned to rest. Similarly at 100 turns and increasingly at 1000 and 10,000 turns additional wheels must be momentarily accelerated and decelerated with an increasing load in each case. The present invention has no intermittent motion in the rotating parts and, therefore, achieves long life and great reliability.

Another advantage of this invention is that more than one notch may be incorporated in the disc, these notches being unequally spaced so as to provide a program in the winding of a coil. Thus, by properly spacing the notches the machine may be stopped automatically for taps or for the first of the primary winding and the start of a secondary winding as well as for the end of the complete secondary. In general these results can be obtained by conventional means only by a multiplicity of individual counters. Furthermore, in using multiple conventional counters each one must be individually adjusted for overrun with considerable frequency as the ambient conditions change. With this invention compensation is automatic for all stops in the complete winding cycle. Thus, this invention is an improved means of programming a winding cycle with the benefits of simplification, low first cost, increased accuracy, and reliability.

Accordingly a principal object of the invention is to provide new and improved means for turning a shaft a predetermined number of turns.

Another object of the invention is to provide new and improved means for successively turning a shaft a predetermined number of turns with automatic compensation for variable overrun.

Another object of the invention is to provide new and improved coil winding means and automatic compensation for variable overrun.

Another object of the invention is to provide new and improved programming means for a shaft turning or coil winding operation.

Another object of the invention is to provide new and improved means for turning a shaft a predetermined number of turns comprising a control disc geared to the driven shaft, said control disc being arranged to de-energize the motor.

Figure 2:
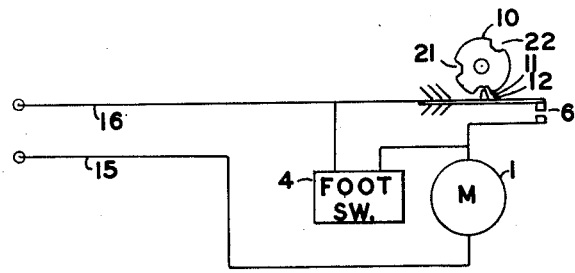

These and other objects of the invention will be apparent from the following specification and drawings, figures of which FIG. 1 is a perspective view of the embodiment of the invention, and FIG. 2 is a schematic circuit diagram of the embodiment of the invention.

Referring to the figures the invention generally comprises a motor 1 connected to a driven shaft 2 upon which may be mounted a coil form 3 for winding a coil. Control switch means 4 is connected to operate the motor in such manner that the motor may be energized by means of the foot or hand operated button 5 and de-energized by opening of the contacts 6.

The compensating means for variable overrun comprises a gear 7 mounted on the shaft 2 which is geared through gear 9 to a second gear 8 mounted on shaft 19, on the other end of which is mounted the control disc or wheel 10. Additional gearing may be added as required. The ratio of the gears 7, 8 and 9 are chosen to provide one revolution of the control disc 10 for the desired number of revolutions of the driven shaft 2. The control disc has one or more notches 11, 21 and 22 which are wider than any possible travel of the disc due to motor overrun. The upper contact 6 which is connected to a cam-follower 12 which is spring loaded against and rides on the periphery of the disc 10 in such manner that when the cam-follower falls into the notch the contacts 6 will open, thereby de-energizing the motor 1. As the motor overruns the contacts 6 will not be again closed as the notch is wide enough for any possible overrun, so that they will not re-start the motor but can only de-energize it.

The motor will then overrun some variable number of turns, for instance 8 turns. When the next coil is placed in position and the start push button 5 pushed the motor will again turn 92 turns until the notch 11 again opens the contacts 6. Assuming the same overrun of 8 turns the number of turns placed on the coil will be the desired number. If the motor warms up further and overruns more this overrun will be automatically compensated. The amount of overrun is not erratic but is smoothly variable so that the compensation will be effective in all cases. The compensation will also work in the reverse direction if the overrun decreases for any reason. Several notches may be made in the disc for programming the winding of a coil, for instance stopping the coil at predetermined points for connecting taps or leads. Each notch compensates for overrun.

Rather than choose gears 7, 8 and 9 for one revolution of the disc 10 we may embody in the machine itself a fixed additional gear reduction of either 100:1 or 1000:1. This is necessary so that the change gears can be selected to give, if necessary, several thousand turns of the main spindle for one revolution of the control disc. If we then wish to wind a coil with only 10 turns we may select a control disc with 10 equally spaced notches and select gears giving a 100:1 ratio from the main spindle. Thus, a small assortment of plates with varying numbers of equally spaced notches greatly increases the effective ratios available through the change gears.

FIG. 2 shows a typical circuit arrangement. The motor 1 is connected to one side of the power line 15. The other side of power line 16 is connected through the momentary foot switch 4 or push button to the motor. The contacts 6 are in parallel with the push button switch and they are normally closed when the cam-follower 12 is not in any one of the notches 11, 21 and 22. The notches are wide enough so that normal overrun of the motor will not reclose the contacts 6. The operation of the circuit is as follows:

The foot switch 4 or push button is pressed closed long enough to have the cam-follower ride out of the notch in the disc 10. Thereafter the motor will continue to operate until the contacts 6 are broken when the cam-follower 12 enters the next one of the notches.

I claim:

Automatic compensating turn counting means for a motor driven shaft, comprising
    means to start said motor,
    means to deenergize said motor after a predetermined number of turns,
    means connected to said deenergizing means to compensate for variable overrunning of said motor, said compensating means comprising a disc having a plurality of notches, said disc being geared to said shaft,
    said deenergizing means comprising a pair of contacts which are adapted to be opened by said notches, said contacts being connected to deenergize said motor, said notches being sufficiently wide to accommodate normal overrunning of said motor to prevent recycling and said notches having angled sides, and an angled follower connected to one of said contacts, said angled follower being adapted to ride out of said notches.

References Cited in the file of this patent
UNITED STATES PATENTS
2,788,482    Ray _____ Apr. 9, 1957
FOREIGN PATENTS
963,857    France _____ Jan. 18, 1950